Jan. 1, 1935.   I. E. McCABE   1,985,940
COMBINED SAFETY AND IGNITION CONTROL FOR THE
AUTOMATIC CONTROL OF BURNER MECHANISM
Filed May 16, 1932   4 Sheets-Sheet 2

INVENTOR
IRA E. McCABE
BY *Langum Moore*
ATTORNEY

Jan. 1, 1935.  I. E. McCABE  1,985,940
COMBINED SAFETY AND IGNITION CONTROL FOR THE
AUTOMATIC CONTROL OF BURNER MECHANISM
Filed May 16, 1932   4 Sheets-Sheet 4

INVENTOR
IRA E McCABE
BY Langdon Moore
ATTORNEY

Patented Jan. 1, 1935

1,985,940

UNITED STATES PATENT OFFICE 1,985,940

COMBINED SAFETY AND IGNITION CONTROL FOR THE AUTOMATIC CONTROL OF BURNER MECHANISM

Ira E. McCabe, Chicago, Ill.

Application May 16, 1932, Serial No. 611,507

14 Claims. (Cl. 158—28)

This invention relates to improvements in electrical controls for electrically operated fluid fuel burners and more particularly to a combined safety and ignition control for the automatic control of the burner mechanism.

It is an object of this invention to provide a relay in the commercial electric circuit which relay is actuated by a room thermostat to control a main line switch also in the commercial circuit in combination with a device responsive to combustion conditions for controlling switches in circuit with the main line switch, one of which switches being in circuit with an ignition device and the other with a thermal device hereinafter referred to as the ignition switch and thermal switch which thermal device controls the operation of a switch in circuit between the main line switch and motor, hereinafter termed the motor switch, whereby the relay controls all circuits of the burner system.

It is also an object of this invention to provide a relay lockout latch which will act upon current interruption to prevent a restart without ignition; a means for allowing the motor switch to remain closed and the thermal device to cool after the opening of the thermal and ignition switches by the actuation of the device responsive to combustion conditions; and a latch, which may be hand reset, operated by the thermal device in the event of ignition failure to cause the opening of the thermal, ignition and motor switches and maintain them open until manually reset.

It is a further object of this invention to employ a repulsion relay which also acts as a transformer, similar to that disclosed in the applicant's prior pending applications 500,747 filed December 8, 1930 and 508,185 filed January 12, 1931, in which the primary coil is in circuit with the commercial line and the secondary coil is in circuit with the room thermostat. A relay of this character acts as a transformer and the windings of the secondary coil may be such that the circuit controlled by the room thermostat is of low voltage.

The advantages of a control of this character for a fluid fuel burner which combines a safety switch, ignition switch and relay permitting the use of an inexpensive low voltage room thermostat and boiler control which may be placed in the secondary circuit of the relay and which prevents operation of the burner when the voltage is too low or when the burner fails to ignite; recycles if the fire goes out; permits adjustable starting and running period during which ignition of the burner is attempted; and upon fluctuating flame conditions being encountered the burner is not permanently shut down but, instead, is temporarily stopped and then relighted; and further has no residual magnetism to interfere with the operation of the relay, as with armature and core magnets, eliminating also the noise which such devices are apt to produce with alternating currents, is obvious.

Another advantage of this device is that all mechanism failures tend to fail on the safe side, that is, if the heating element of the thermal device burns out, the burner cannot be started; if the relay burns out, it cannot start the burner; if the operating member of the device responsive to combustion conditions burns off, it will place the control in inoperative position, and if the control is improperly mounted, so that it is not in an upright position it cannot operate, as either the relay or motor switch will remain open if the control is tilted to the right or left more than ten degrees from the vertical.

While a preferred embodiment of this invention is illustrated upon the accompanying sheets of drawings, it is understood that minor detail changes may be made therein without departing from the scope thereof.

In the embodiment of this invention as illustrated the operation of the various parts is controlled by the opening and closing of the main line switch L, one terminal of which is connected to one wire C of the commercial line with the other terminal adapted to be connected through certain other elements of the control mechanism to the other wire C' of the commercial line. The main line switch L is actuated by a relay preferably of the construction disclosed in the applicant's prior pending applications aforesaid in which the primary coil 1 is stationary and is connected in multiple to the commercial circuit. The secondary coil 2 is preferably of low voltage and is connected in circuit with a room thermostat R and a boiler control B, both of which are commercial articles and their use well known in connection with oil burner control circuits. The secondary coil is mounted to travel upon the core 3 and in so doing tilt the pivoted arm 4 mounting the switch L. It is preferable to mount this switch so that when the circuit through the room thermostat is open and the secondary coil rests upon the primary coil, the switch L will be in open position. Upon the closing of the room thermostat to operate the oil burning mechanism, the secondary coil being energized will be repelled and maintained in a floating position above the primary coil and operate the switch L to close the circuit therethrough and maintain it closed as long as the secondary coil is floating.

It is preferable to employ in this control a device responsive to combustion conditions constructed in accordance with the applicant's prior Patent 1,762,183, dated June 10, 1930, in which a thermostatic coil 5 of bi-metallic metal is adapted to be inserted and held within the stack of the oil burning furnace, in the usual manner or otherwise, subjected to the temperature of the burning fuel. One end of the thermostatic coil is secured to a projection from a panel or plate 6 which also mounts the various elements of this construction. The other end of the coil is secured to a rotatable actuating shaft 7 which passes through the said panel or plate and mounts upon the free end a switch actuating plate 8. Thermostatic coils of this type and for this purpose are well known and are commercial articles in this trade. In the device disclosed herein it is preferable to provide a coil so constructed as to contract, curl or wind up on being heated and thereafter to expand, uncurl or unwind upon cooling. As the coil 5 is caused to contract or expand in accordance with the presence or absence of the burner flame, movement will be imparted to the switch actuating plate 8 through the toothed wheel 9 and plates 10 until the switch actuating plate 8 engages the stop 11 in one direction or the plate 10 engages the stop 12 in the other direction and then allow further expansion or contraction of the thermal coil 5 in the manner clearly disclosed and described in said Patent 1,762,183. The device referred to is termed a stack switch mechanism and is a commercial article which has gone into general use in this art. As this device is described in detail in said applicant's prior Patent No. 1,762,183 of June 10, 1930, it is thought sufficient to the general understanding of its operation to state that the toothed wheel 9 is keyed upon the shaft 7, plate 8 is rotatably mounted on the shaft 7. Plates 10 are pivotally mounted on pin 8a extending transversely of plate 8 and said plates 10 have a loose fit over shaft 7. The toothed wheel 9 is engaged by a roller 10a mounted on a pin 10b joining the plates 10, which roller is held in contact with the toothed wheel 9 by the weight of the plates 10, whereby the actuating plate 8 is caused to rotate in conjunction with the wheel 9 until either stop 11 or 12 is engaged and then continued rotation of the wheel 9 in the same direction will cause the wheel 9 to travel under the roller 10a, but immediately upon counterrotation of wheel 9 will cause the actuating plate 8 to rotate with it.

Figures 4, 5:
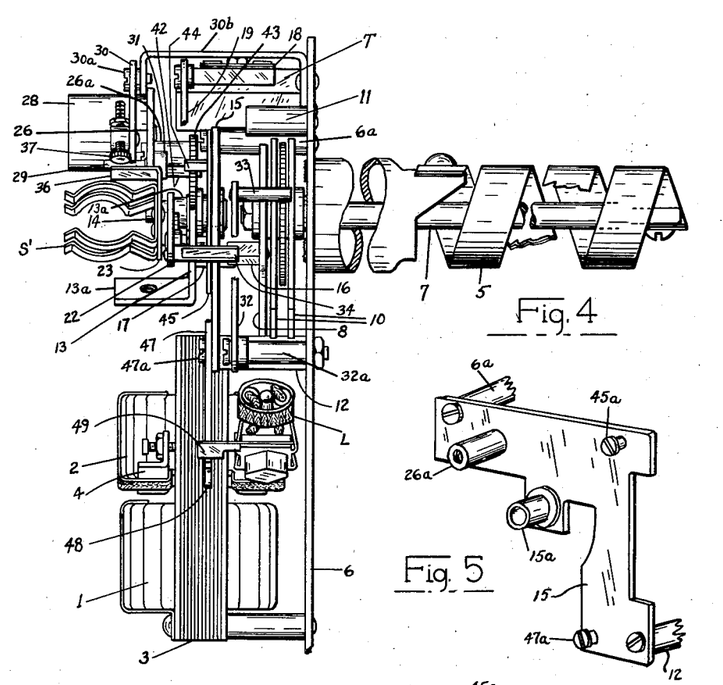
Figure 4 is a view in side elevation, with parts broken away of the device responsive to combustion conditions including the operating parts and actuating member therefore.
Figure 5 is a perspective detail view of the switch mechanism supporting plate spaced apart from the panel.
Figure 6:
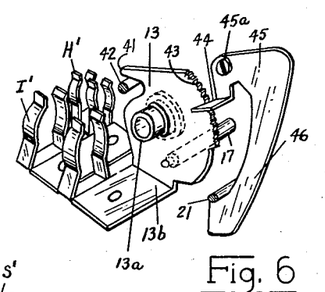
Figure 6 is a perspective detail view of the rotatable switch carrying plate for the thermal and ignition switches and carrier latch.

A switch mechanism supporting plate 15 is spaced apart from the panel 6 and stack operated mechanism by studs 6a, one of which also acts as the stop 12, as shown in Figures 4 and 5. A switch carrier plate 13 mounts a bushing 13a which is mounted to rotate upon a bearing 15a staked upon the supporting plate 15 in line with the axis of shaft 7 which bearing rotatably receives a post 14 in axial prolongation thereof, as shown in Figures 4, 5 and 6. The switch carrying plate 13 is provided below its pivot with a right angular extension 13b provided with means to mount thereon a heater switch H and an ignition switch I in brackets H' and I', respectively, secured to said extension 13b at one side of the pivot 13a, and is provided with an arcuate serrated portion 43 and an oppositely extending nose 41, both of which will be hereinafter described. An actuating post 16 is mounted upon the actuating plate 8 which is adapted to engage a pin 17 extending from the rear side of the switch carrying plate 13 and rotate the plate as the thermal coil 5 contracts or winds up upon heating. The switch carrying plate 13 carries the switches H and I in such relation that the weight of the respective switches and plate will rotate the said plate in the opposite direction when the thermal coil 5 expands upon cooling and causes the pin 17 to follow the actuating post 16. The switches L, H and I are preferably commercial mercury tube switches and the switches H and I are both mounted upon the plate 13 so that when the thermal coil has expanded, as when the oil burner mechanism is idle, both of these switches will be in the closed position.

The commercial circuit is completed through the main line switch L and the current passes through the closed thermal switch H and a resistance heating element T carried in a support T' mounted upon the panel 6 above the plate 15 to close the motor switch S and then a portion of the current passes from the switch S through the ignition switch I and through an electrical ignition device, as hereinafter described.

When the circuit through the thermal heating element T is closed the heat produced acts upon a strip of thermal bi-metallic metal 18 secured at one end to said heating element T' causing the free end to deform in an upward direction. Pivoted by pivot 18a to the free end of the strip 18 is an operating link 19 having a slotted connection 20 with an elongated transverse pin 21 upon an elongated actuating plate 22 secured at one end to and mounted to rotate with the post 14. A switch carrier plate 23 is pivotally mounted intermediate its ends upon a pin 24 upon the plate 22 between the post 14 and pin 21 and is provided with a curved extension 25 adapted to pass over and be brought to engage the upper side of the post 14 and, under certain conditions, cause the switch carrier plate 23 to rotate with the plate 22. The plate 23 mounts in clip S' carried thereby the motor switch S which is normally in the open position when the burner mechanism is idle or cold. This switch S is also preferably a commercial mercury tube switch.

Figure 8:
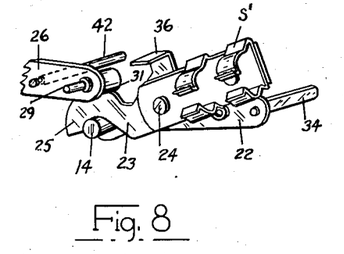
Figure 8 is a perspective detail view of the motor switch carrier plate and coacting parts.
Figure 9:
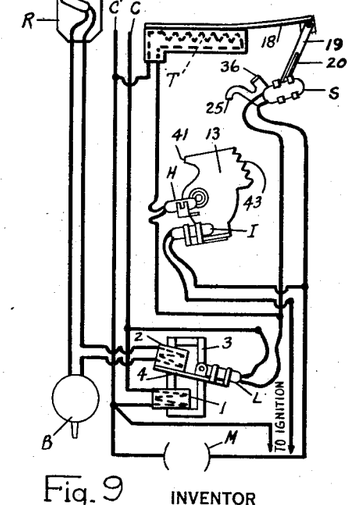
Figure 9 is a schematic wiring diagram illustrating the elements of this invention in the position assumed during the ignition period.
Figure 10:
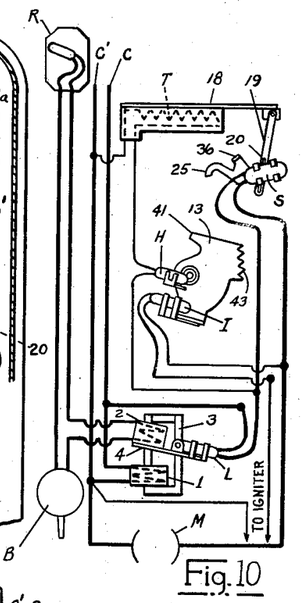
Figure 10 is a similar diagram illustrating the position assumed by the elements during the normal running of the burner mechanism.

A hand reset arm 26 is pivotally mounted upon a stud 26a extending from supporting plate 15, intermediate its ends, having an arcuate extension 27 at one end adapted to pass through the side of the casing to be manually engaged and it is preferable to provide a weight 28 adjacent this end normally acting to raise the other end. The end opposite the manual engaging member 27 is provided with a pin 29 which, when that end is depressed to the normal end of its travel, is adapted to be engaged by the reset latch 30 pivoted at one end by pin 30a upon bracket 30b extending from panel 6 and having a shoulder 30c on the free end to hold it in that position. The pin 29 extends through the arm 26 and is provided with an enlargement 31 which extends over the curved extension 25 upon the plate 23 and when the hand reset is in engagement with the latch 30, this portion of pin 29 will engage the upper portion of the curved extension 25 as shown in Figure 8, so that as the thermal element 18 expands and draws the operating link 19 upward the bottom of the slot 20 therein will engage the pin 21 upon the actuating plate 22 imparting an upward rotative movement about the post 14 and as the extension 25 rotates between the post 14 and enlargement of pin 29, the switch carrier plate 23 will also rotate in an upward direction and close the motor switch S. The closing of the motor switch S will close the circuit through the switch L and motor M with which it is connected in series and at the same time will connect the ignition switch I to conduct a portion of the current passing through the motor switch S on its way to the motor through an electrical ignition device, of commercial construction, connected in series therewith to the commercial line C'.

It is therefore seen that when the room thermostat calls for heat or closes the secondary circuit the relay acts to close the main line switch L and the current flowing therethrough passes through the heater switch H and through the resistance heating element T. The motor switch being normally in the open position no current passes therethrough to either the ignition device or the motor until the deforming of the thermal element 18 closes the motor switch, as above described, and then the motor begins to operate to feed fluid fuel to the combustion chamber of the furnace and at the same time a portion of the current passing through the motor switch is diverted and passes through the normally closed ignition switch I to the electrical ignition device, causing the latter to ignite the fluid fuel. Upon combustion occurring the thermostatic element 5 responds thereto and causes the switch actuating plate 8 to rotate which in turn through post 16 and pin 17 rotates the switch carrying plate 13 to open the heater switch H and the ignition switch I and the burner mechanism will continue to operate as long as the commercial current passes through switch L and switch S. However, the opening of switch H cuts out the resistance heating element T and the bi-metallic strip 18 which has closed the motor switch will cool, return to normal position, and, unless some means is provided, will allow the motor switch to return to the open position. In order to allow the motor to continue to operate as long as the thermostat calls for heat, after the motor switch has been closed, a motor switch latch 32 is provided which is pivoted at its lower end upon a stud 32a extending from the panel 6 and to one side of the plate 10. The upper end is provided with a transverse pin 33 which normally rests upon the circumference of the plate 10 and allows the latch to rotate about its pivot as the plate 10 is caused to rotate, and is cut out between pin 33 and pivot 32a to form a toothed portion 35, to be hereinafter described. The actuating plate 22 secured to the post 14 and carrying the motor switch carrying plate 23 is provided at its free end with an angularly projecting motor switch latch catch pin 34 which is adapted to be engaged by a toothed segment 35 upon the adjacent face of the latch 32 when the motor switch has been closed and the device responsive to combustion conditions has caused the plate 10 to rotate and allow the latch 32 to likewise rotate to bring the toothed segment 35 into engagement with the catch 34.

It is therefore seen that by this means when the burner mechanism has been normally operated to create combustion in the furnace, the motor M will continue to operate under normal conditions and the motor switch will be locked by the latch 32 in closed position. Upon the opening of the room thermostat, the relay will open the switch L breaking the circuit to the motor and the flame will cease. The device responsive to combustion conditions will then cool causing the plate 10 to rotate to lift the latch 32 out of engagement with the catch 34 which will free the motor switch to assume its normal open position.

Figure 13:
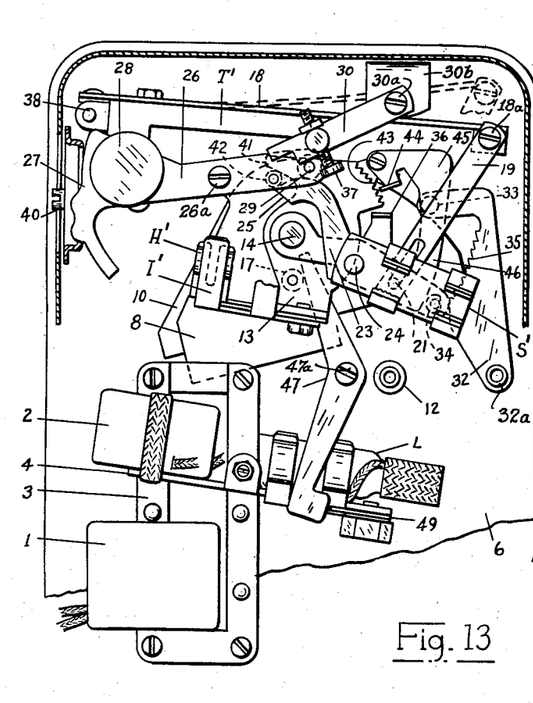
Figure 13 is a view similar to Figure 1 illustrating the position assumed by the elements of this invention upon an ignition failure.
Figure 14:
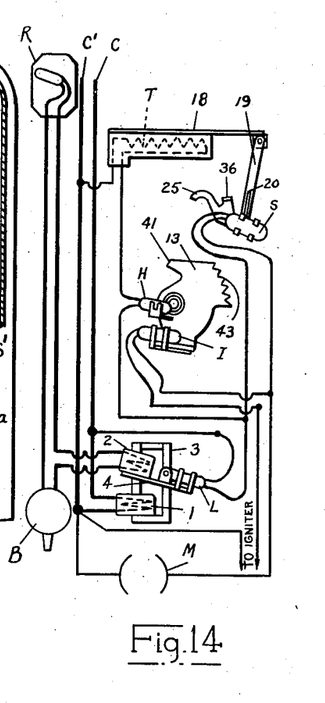
Figure 14 is a schematic wiring diagram including the elements of this invention in the positions assumed as shown in Figure 13.

The motor switch carrier plate 23 in addition to the curved extension 25 is provided with an angular extension 36 upon its upper side above its pivot 24 which is adapted to engage with an adjustable abutment 37 carried upon the hand reset latch 30 whereby in the event that when the room thermostat calls for heat and for any reason ignition does not occur and the plate 13 carrying the switches H and I remains in its normal position with these switches closed, the continued deformation of the thermal strip 18 will continue to rotate the plate 22 and the motor switch carrying plate 23, causing the extension 36 to engage the abutment 37 and free the hand reset arm 26 whereupon the enlargement 31 of the pin 29 is caused to move upward freeing the extension 25 and allowing the motor switch carrier plate 23 to rotate about the pin 24 to assume the open position which will break the motor circuit as shown in Figure 13. The motor switch will remain in this position until the thermal strip cools and the manual reset arm 37 is actuated by manual engagement with the extension 27 to cause the engagement of the extension 25 with the enlargement 31 and allow the latch 30 to engage the pin 29.

The abutment 37 is adjustable upon the latch 30 as shown, whereby the period of the operation of the device to produce combustion is determined. It is also preferable to mount the support T for the thermal strip 18 and resistance heating member T in adjustable position upon the panel 6 as shown to establish the desired pre-ignition period. The support T' of these parts is preferably pivotally mounted upon a pin 38 and the support is provided with a downward projection 39 which is engaged by a screw-threaded shaft 40 mounted in a bearing secured to the panel 6, whereby the angular relation of the free end of the strip 18 to the pin 21 may be adjusted.

Figures 1, 2, 3:
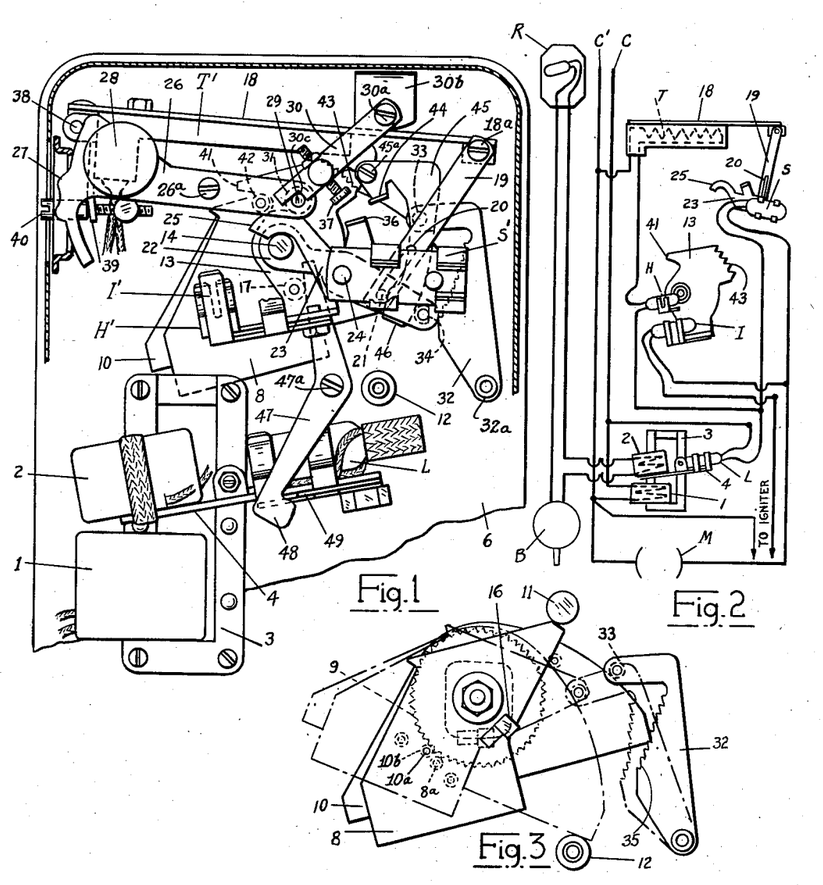
Figure 1 is a view in front elevation of the panel mounting the control elements of this invention, with the cover thereof shown in section and with parts broken away, illustrating the positions assumed by the various elements when the burner mechanism is idle or cold.
Figure 2 is a schematic wiring diagram including the elements of this invention in the position assumed as shown in Figure 1.
Figure 3 is a view in elevation of the operating parts of the device responsive to combustion conditions.

The plate 13 carrying the switches H and I is provided with an extension 41 which extends over a transverse pin 42 carried by the manual reset arm 26 intermediate its pivotal point and the pin 29, when the switches H and I are in their normal closed position as shown in Figure 1, so that should ignition fail to occur when the room thermostat is closed and the hand reset is released to allow the motor switch to open, the upward movement of the pin 42 caused by the mass of the weight 28 effecting rotation of the arm, will engage the extension 41 and rotate the plate 13 to open the switches H and I, as shown in Figure 13, whereupon the resistance heater T will cool and the strip 18 return to its normal position, and the control rendered inoperative until manually reset as before described.

Figure 7:
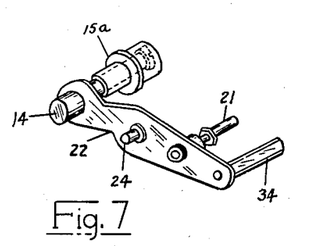
Figure 7 is a perspective detail view of the actuating plate.
Figure 11:
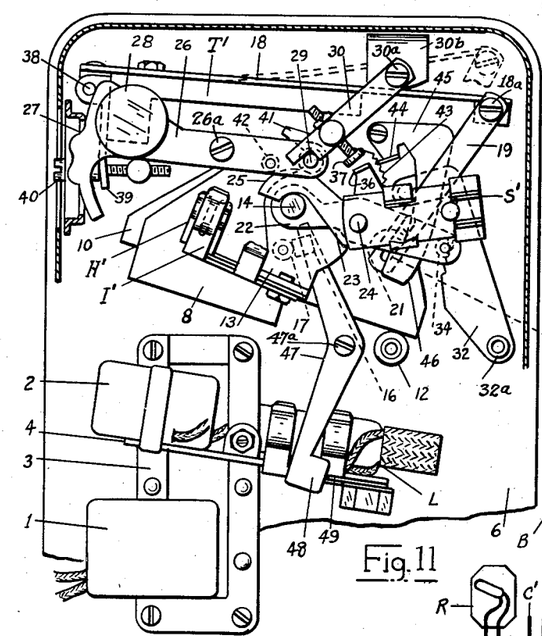
Figure 11 is a view similar to Figure 1, illustrating the position assumed by the elements of this invention during the normal running of the burner mechanism, as illustrated in Figure 10.
Figure 12:
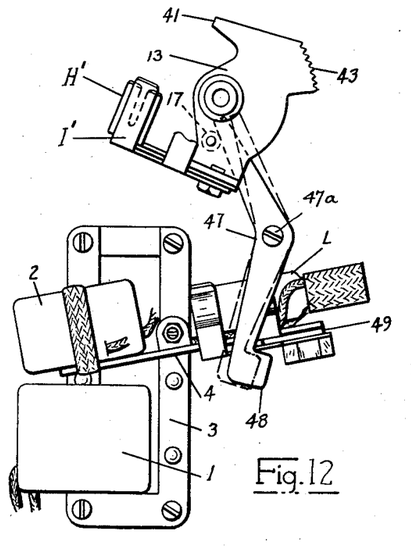
Figure 12 is a detail view in elevation of the relay, lockout latch and associated parts, acting upon current interruption to prevent a restart without ignition.

The switch carrying plate 13 mounting the switches H and I is rotated by the operation of the device responsive to combustion conditions, as hereinbefore described, to open both of the circuits to the resistance heater T and the ignition device after combustion occurs. It is desirable to lock these switches in open position when the motor switch is closed and maintain them in that position as long as the motor switch remains closed. To this end the arcuate serrated segment 43 is provided upon the plate 13 which is adapted to be engaged by a catch 44 on one end of a carrier latch 45 pivoted on pin 45a extending from the plate 15 which latch is provided with a depending extension 46 adapted to be engaged by the transverse pin 21 upon the actuating plate 22 of the motor switch S as shown in Figures 6 and 7. When the motor switch has been closed thereby withdrawing pin 21 from engagement with said extension, the latch 43 rotates to engage catch 44 with the teeth of the serrated portion 43 and the catch rides thereover as the plate 13 is rotated to open the switches H and I and thereafter hold the switches when they have been placed in open position, as shown in Figure 11, until the motor switch is freed from the latch 32, whereupon it drops to normal position and the pin 21 engages extension 46 to rotate the latch 45 to disengage catch 44 and plate 13 is freed to return to normal closed positions the switches H and I, as shown in Figure 1.

At times there are interruptions of current in commercial lines for various reasons. Sometimes the interruptions are but momentary and other times there is quite a delay before the current is resumed. If a current interruption is of short duration and occurs in this control before the motor switch is closed, the result will be only a momentary delay in the action of the control parts for when the current is resumed the control will immediately proceed to function in its normal manner. During the normal operation of the burner the device responsive to combustion conditions causes the opening of the switches H and I and allows the motor switch latch 32 to maintain the motor switch S closed and the latch 45 locks the plate 13 against the closing of the switches H and I so that should the current be interrupted at this stage and then resumed before the combustion chamber cools, the motor will be started without ignition and a delayed ignition creates a dangerous condition in the combustion chamber. In order to prevent this condition a relay lockout latch 47 is provided which is pivotally mounted intermediate its length on a pin 47a carried on plate 15 having an arm extending below its pivotal point and terminating in a projection 48 adapted to engage under a catch 49, extending from the arm 4 carrying the switch L, when the relay is deenergized and this switch is in its open position. The lockout latch is provided with another extension above its pivotal point adapted to be engaged by the transverse pin 17 upon the rear of plate 13 which will maintain the projection 48 out of engagement with the catch 49 when the switches H and I are in the closed position and when the plate 13 is rotated by the device responsive to combustion conditions to open these switches the pin 17 will be moved to allow the counterclockwise rotation of the latch 47 should the catch 49 be moved out of abutment with the projection 48. The projection 48 is of sufficient width that during normal operation it is positioned by the end of the catch 49 to maintain the two out of engagement. In the case of a current interruption when the mechanism is normally furnishing heat the plate 13 will have been rotated to open the switches H and I so that as soon as the current deenergizes the relay, the end of the catch 49 will be moved out of abutment with the latch projection 48 and the latch will then rotate to place the projection under the catch and prevent the closing of switch L until the combustion chamber cools, whereupon the plate 13 rotates to close the switches H and I and at the same time the pin 17 engages the upper end of the latch 47 to cause its rotation to free the switch L and thus all the parts return to the starting position and are free to recycle upon current resumption.

Should the fire become extinguished for any reason during the normal operation of the burner, the device responsive to combustion conditions would cool and in assuming its normal cooled position would release the motor switch holding latch 32 and the motor switch in assuming the open position would release the heater and ignition holding latch 45 to permit the plate 13 to return the switches H and I to the normal closed position. During the normal operation of the burner the room thermostat R would be in the closed position so that the relay would be energized and the main line switch L held in the closed position during the operation of the parts above described upon the failure of the flame and as the device, responsive to combustion conditions, returns the plate 13 to its normal position to close the switches H and I the line current passing through the switch L would cause the device to recycle. If ignition failed upon the recycling of the control, the control would then act to shut down the burner mechanism, as heretofore described upon an ignition failure, and necessitate a manual reset after the trouble had been removed. If the fuel became ignited after the flame failed the control would operate in its normal manner as when the room thermostat first calls for heat.

Figures 15, 16, 17:
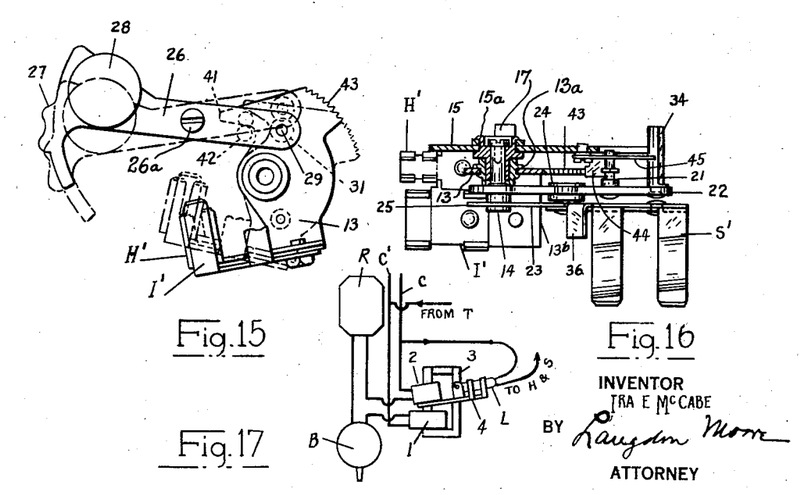
Figure 15 is a detail view in elevation of the hand reset latch and associated parts.
Figure 16 is a fragmentary detail top plan view, partly in section, of the operating parts carrying the motor switch, ignition switch and thermal switch and the parts associated therewith.
Figure 17 is a fragmentary schematic wiring diagram illustrating a relay constructed for employment with a direct current commercial line.

The repulsion relay illustrated and referred to in connection with the first sixteen figures of the drawings is of the type disclosed in the applicant's said prior co-pending application, Serial No. 500,747, where the commercial source of electricity produces an alternating current. Figure 17 illustrates the application in this invention of the type of relay disclosed in the applicant's said prior co-pending application, Serial No. 508,185 to be installed in such cases where the commercial source of electricity produces a direct current.

What I claim is:

1. In an electrically operated and controlled fluid burning mechanism, a source of electricity, a motor for operating the mechanism, an electric igniter for the fuel, a repulsion transformer relay having its primary coil in circuit with said source and a control switch in circuit with its secondary coil, a main switch in circuit with said source operated by the actuation of the relay in repelling the secondary coil to establish a circuit through said motor and igniter, a normally open motor switch in the motor circuit, an electrothermal element for controlling the motor switch, a normally closed heater switch to establish a circuit from the main switch through the heater of said electro-thermal element and a normally closed ignition switch in the ignition circuit, means responsive to combustion conditions mounting said heater and ignition switches said means in the absence of combustion operating to maintain said heater and ignition switches closed thereby permitting the closing of the main switch to energize the heater of said electro-thermal element to close the motor switch and upon the establishment of combustion to open the heater and ignition switches and to maintain the motor switch closed.

2. In an electrically operated and controlled fluid burning mechanism, a source of electricity, a motor for operating the mechanism, an electric igniter for the fuel, a repulsion transformer relay having its primary coil in circuit with said source and a control switch in circuit with its secondary coil, a main switch in circuit with said source operated by the actuation of the relay in repelling the secondary coil to establish a circuit through said motor and igniter, a normally open motor switch in the motor circuit, an electrothermal element for controlling the motor switch, a normally closed heater switch to establish a circuit from the main switch through the heater of said electro-thermal element and a normally closed ignition switch in the ignition circuit, a device responsive to combustion conditions mounting said heater and ignition switches said means in the absence of combustion operating to maintain said heater and ignition switches closed thereby permitting closing of the main switch to energize the heater of said electro-thermal element to close the motor switch and upon the establishment of combustion to open the heater and ignition switches and to maintain the motor switch closed, and means operating upon the opening of the main switch in conjunction with the cooling of the device responsive to combustion conditions to free the motor switch to return to open position.

3. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, a device responsive to combustion conditions mounting said normally closed switches, the closing of the main switch actuating the said means to close the motor switch to establish a motor circuit and an ignition circuit through said main switch, said device responsive to combustion operating upon establishment of combustion to open both the ignition switch and the switch in circuit with the motor switch closing means, and means controlled by the device responsive to combustion conditions to lock the motor switch in closed position upon establishment of combustion.

4. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, a device responsive to combustion conditions mounting said normally closed switches, the closing of the main switch actuating the said means to close the motor switch to establish a motor circuit and an ignition circuit through said main switch, said device responsive to combustion operating upon establishment of combustion to open both the ignition switch and the switch in circuit with the motor switch closing means, means controlled by the device responsive to combustion conditions to lock the motor switch in closed position upon establishment of combustion and upon cessation of combustion to free said motor switch to assume normal open position.

5. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, a device responsive to combustion conditions mounting said normally closed switches, the closing of the main switch actuating the said means to close the motor switch to establish a motor circuit and an ignition circuit through said main switch, said device responsive to combustion operating upon establishment of combustion to open both the ignition switch and the switch in circuit with the motor switch closing means, means controlled by the device responsive to combustion conditions to lock the motor switch in closed position upon establishment of combustion and upon cessation of combustion to free said motor switch to assume normal open position, said last named means including a pivoted plate carrying the motor switch and a pivoted latch adapted to be engaged to hold said plate with the motor switch in closed position and cooperating with the device responsive to combustion conditions when cold to remove said latch out of the path of said plate.

6. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, a device responsive to combustion conditions mounting said normally closed switches, the closing of the main switch actuating the said means to close the motor switch to establish a motor circuit and an ignition circuit through said main switch, said device responsive to combustion operating upon establishment of combustion to open both the ignition switch and the switch in circuit with the motor switch closing means, and means acting in conjunction with said means for closing the motor switch after the establishment of the circuit therethrough and upon failure of ignition thereafter, to open the motor switch.

7. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, means responsive to combustion conditions mounting said normally closed switches, the closing of the main switch actuating the said means to close the motor switch to establish a motor circuit and an ignition circuit through said main switch, said means responsive to combustion operating upon establishment of combustion to open both the ignition switch and the switch in circuit with the motor switch closing means, means acting in conjunction with said means for closing the motor switch after the establishment of the circuit therethrough and upon failure of ignition thereafter, to open the motor switch, and additional means released thereby requiring a manual reset before normal operation can be reestablished.

8. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, means responsive to combustion conditions mounting said normally closed switches, the closing of the main switch actuating the said means to close the motor switch to establish a motor circuit and an ignition circuit through said main switch, said means responsive to combustion operating upon the establishment of combustion to open both the ignition switch and the switch in circuit with the motor switch closing means, means acting in conjunction with said means for closing the motor switch, after the establishment of the circuit therethrough and upon failure of ignition thereafter, to open the motor switch, said means including a pivoted motor switch actuating plate having an operative connection with said motor switch operating means and pivotally mounting intermediate its length, a motor switch carrying plate provided with a projection adapted to be brought into engagement with the actuating plate pivot, a pivoted hand rest arm adapted to engage the said projection and hold it in pivotal engagement with said pivot, a pivoted latch normally maintaining such pivotal engagement, an additional projection upon the motor switch carrying plate adapted, upon failure of combustion causing the continuation or establishment of the circuit through the motor switch operating means after the closure of the motor switch to impart further movement to the motor switch carrier plate, to engage the said projection thereon with the said latch to release the hand reset arm to free the motor switch carrier plate to rotate about its pivot to the open position.

9. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, means responsive to combustion conditions mounting said normally closed switches, the closing of the main switch actuating the said means to close the motor switch to establish a motor circuit and an ignition circuit through said main switch, said means responsive to combustion operating upon establishment of combustion to open both the ignition switch and the switch in circuit with the motor switch closing means, means acting in conjunction with said means for closing the motor switch after the establishment of the circuit therethrough and upon failure of ignition thereafter, to open the motor switch, said means including a pivoted motor switch actuating plate having an operative connection with said motor switch operating means and pivotally mounting intermediate its length, a motor switch carrying plate provided with a projection adapted to be brought into engagement with the actuating plate pivot, a pivoted hand reset arm adapted to engage the said projection and hold it in pivotal engagement with said pivot, a pivoted latch normally maintaining such pivotal engagement, an additional projection upon the motor switch carrying plate adapted, upon failure of combustion causing the continuation or establishment of the circuit through the motor switch operating means after the closure of the motor switch to impart further movement to the motor switch carrier plate, to engage the said projection thereon with the said latch to release the hand reset arm to free the motor switch carrier plate to rotate about its pivot to the inoperative position, and means upon the mounting of the ignition switch and switch in circuit with the motor switch operating means actuated in response to combustion conditions coacting with means upon said hand reset arm coacting with said means upon said mounting, upon release of the reset arm, to rotate the said mounting to place both switches mounted thereon in open position.

10. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, means responsive to combustion conditions mounting said normally closed switches, the closing of the main switch actuating the said means to close the motor switch to establish a motor circuit and an ignition circuit through said main switch, said means responsive to combustion operating upon establishment of combustion to open both the ignition switch and the switch in circuit with the motor switch closing means, and means, upon combustion having been established and the ignition switch and the switch in circuit with the motor switch operating means having been opened, to lock said switches open as long as the motor switch remains closed including a latch releasible by the closing of the motor switch to engage the mounting of said switches.

11. In an electrically operated and controlled fluid fuel burning mechanism, a source of electricity, a motor for operating the mechanism, an electric igniter for the fuel, a main switch in circuit with said source, a normally open motor switch, a normally closed ignition switch, electrically actuated means for closing the motor switch, means to control operation of the main switch to establish a circuit through said motor switch closing means, a normally closed switch in circuit between the main switch and motor switch closing means, means responsive to combustion conditions mounting said normally closed switches, the closing of the main switch actuating the said means to close the motor switch to establish a motor circuit and an ignition circuit through said main switch, said means responsive to combustion operating upon establishment of combustion to open both the ignition switch and the switch in circuit with the motor switch closing means, means upon combustion having been established and the ignition switch and the switch in circuit with the motor switch operating means having been opened, to lock said switches open as long as the motor switch remains closed, including a switch carrying plate for said switch coacting with the means responsive to combustion conditions to open both of said switches upon establishment of combustion and a pivoted catch adapted to engage and lock said carrying plate when said switches are opened, a pivoted motor switch actuating plate having an operating connection with the motor switch operating means having a portion coacting with said catch to free the said carrying plate upon the opening of the motor switch.

12. In an electrically operated and controlled fluid burning mechanism, a source of electricity, a motor for operating the mechanism, an electric igniter for the fuel, a repulsion transformer relay having its primary coil in circuit with said source and a control switch in circuit with its secondary coil, a main switch in circuit with said source operated by the actuation of the relay in repelling the secondary coil to establish a circuit through said motor and igniter, a normally open motor switch in the motor circuit, an electro-thermal element for controlling the motor switch, a normally closed heater switch to establish a circuit from the main switch through the heater of said electro-thermal element and a normally closed ignition switch in the ignition circuit, means responsive to combustion conditions mounting said heater and ignition switches said means in the absence of combustion operating to maintain said heater and ignition switches closed thereby permitting closing of the main switch to energize the heater of said electro-thermal element to close the motor switch and upon the establishment of combustion to open the heater and ignition switches and to maintain the motor switch closed, and means during the normal running of the burner upon a current interruption and resumption before the combustion chamber cools, to lock the main switch in open position.

13. In an electrically operated and controlled fluid burning mechanism, a source of electricity, a motor for operating the mechanism, an electric igniter for the fuel, a repulsion transformer relay having its primary coil in circuit with said source and a control switch in circuit with its secondary coil, a main switch in circuit with said source operated by the actuation of the relay in repelling the secondary coil to establish a circuit through said motor and igniter, a normally open motor switch in the motor circuit, an electro-thermal element for controlling the motor switch, a normally closed heater switch to establish a circuit from the main switch through the heater of said electro-thermal element and a normally closed ignition switch in the ignition circuit, means responsive to combustion conditions mounting said heater and ignition switches, said means in the absence of combustion operating to maintain said heater and ignition switches closed thereby permitting closing of the main switch to energize the heater of said electro-thermal element to close the motor switch and upon the establishment of combustion to open the heater and ignition switches and to maintain the motor switch closed, and means during the normal running of the burner upon a current interruption and resumption before the combustion chamber cools to lock the main switch in open position and release the main switch to be nomally closed after the combustion chamber cools.

14. In an electrically operated and controlled fluid burning mechanism, a source of electricity, a motor for operating the mechanism, an electric igniter for the fuel, a repulsion transformer relay having its primary coil in circuit with said source and a control switch in circuit with its secondary coil, a main switch in circuit with said source operated by the actuation of the relay is repelling the secondary coil to establish a circuit through said motor and igniter, a normally open motor switch in the motor circuit, an electro-thermal element for controlling the motor switch, a normally closed heater switch to establish a circuit from the main switch through the heater of said electro-thermal element and a normally closed ignition switch in the ignition circuit, means responsive to combustion conditions mounting said heater and ignition switches, said means in the absence of combustion operating to maintain said heater and ignition switches closed thereby permitting closing of the main switch to energize the heater of said electro-thermal element to close the motor switch and upon the establishment of combustion to open the heater and ignition switches and to maintain the motor switch closed, and means during the normal running of the burner upon a current interruption and resumption before the combustion chamber cools to lock the main switch in open position and release the main switch to be normally closed after the combustion chamber cools, said means including a pivoted lock out latch adapted normally to engage and lock the primary coil of the relay in its deenergized position coacting with the means responsive to combustion conditions when cold to hold the latch out of engagement and after establishment of combustion to release said latch to engage and lock said coil upon deenergization of the relay.

IRA E. McCABE.